(12) United States Patent
Matsui et al.

(10) Patent No.: US 8,497,002 B2
(45) Date of Patent: Jul. 30, 2013

(54) LIQUID CRYSTAL DISPLAY DEVICE

(75) Inventors: Chikae Matsui, Mobara (JP); Noboru Kunimatsu, Chiba (JP); Hidehiro Sonoda, Mobara (JP)

(73) Assignees: Hitachi Displays, Ltd., Chiba (JP); Panasonic Liquid Crystal Display Co. Ltd., Hyogo-Ken (JP)

( * ) Notice: Subject to any disclaimer, the term of this patent is extended or adjusted under 35 U.S.C. 154(b) by 987 days.

(21) Appl. No.: 12/560,770

(22) Filed: Sep. 16, 2009

(65) Prior Publication Data

US 2010/0066961 A1 Mar. 18, 2010

(30) Foreign Application Priority Data

Sep. 16, 2008 (JP) ................................. 2008-235900

(51) Int. Cl.
*C09K 19/00* (2006.01)
*G02F 1/1337* (2006.01)

(52) U.S. Cl.
USPC ......... 428/1.25; 428/1.1; 428/1.26; 428/1.33; 349/129

(58) Field of Classification Search
None
See application file for complete search history.

(56) References Cited

U.S. PATENT DOCUMENTS

| 5,376,733 | A  | * | 12/1994 | Okinoshima et al. | 525/431 |
| 5,872,611 | A  | * | 2/1999  | Hirata et al.     | 349/147 |
| 6,235,867 | B1 | * | 5/2001  | Eguchi et al.     | 528/170 |
| 6,266,121 | B1 | * | 7/2001  | Shigeta et al.    | 349/156 |
| 6,943,861 | B2 | * | 9/2005  | Tomioka et al.    | 349/141 |
| 2006/0091397 | A1 | * | 5/2006 | Akimoto et al.   | 257/72  |

FOREIGN PATENT DOCUMENTS

| JP | 02-059723  | 2/1990  |
| JP | 02-300723  | 12/1990 |
| JP | 10-039308  | 2/1998  |
| JP | 2003-066458 | 3/2003  |
| JP | 2004-206091 | 7/2004  |

* cited by examiner

*Primary Examiner* — Gwendolyn Blackwell
*Assistant Examiner* — Anthony J Frost
(74) *Attorney, Agent, or Firm* — Antonelli, Terry, Stout & Kraus, LLP.

(57) ABSTRACT

An alignment film is given a 2-layer structure comprising a photoalignment film that is photoalignable and a low-resistivity alignment film whose resistivity is smaller than that of the photoalignment film. The photoalignment film is formed by a polyimide whose precursor is polyamide acid alkyl ester, the number molecular weight of the photoalignment film is large, and the stability of alignment of the photoalignment film by photoalignment is excellent. The low-resistivity alignment film is formed by a polyimide whose precursor is polyamide acid, the number molecular weight of the low-resistivity alignment film is small, and the resistivity of the low-resistivity alignment film is small. The 2-layer structure alignment film can be maintaining an excellent photoalignment characteristic, so DC afterimages can be controlled.

6 Claims, 7 Drawing Sheets

A

LIQUID CRYSTAL DISPLAY DEVICE

CLAIM OF PRIORITY

The present application claims priority from Japanese application serial No. 2008-235900, filed on Sep. 16, 2008, the content of which is hereby incorporated by reference into this application.

BACKGROUND

1. Technical Field

The present invention pertains to a liquid crystal display device and particularly relates to a liquid crystal display device that is equipped with a liquid crystal display panel where alignment control ability is imparted to an alignment film by irradiation with light.

2. Related Art

Liquid crystal display devices have a TFT substrate on which pixel electrodes and thin film transistors (TFTs) are formed in a matrix, an opposing substrate that opposes the TFT substrate and on which color filters are formed in places corresponding to the pixel electrodes of the TFT substrate, and liquid crystal that is held between the TFT substrate and the opposing substrate. Additionally, liquid crystal display devices form an image by controlling, per pixel, the transmittance of light by the liquid crystal molecules.

Liquid crystal display devices are flat and lightweight, so they are used for various purposes in many different fields, from large display devices in televisions and the like to mobile telephones and digital still cameras (DSC). On the other hand, viewing angle characteristics of liquid crystal display devices are a problem. Viewing angle characteristics are a phenomenon where brightness varies or chromaticity varies between when the screen is seen from the front and when the screen is seen from a diagonal direction. In-Plane Switching (IPS), where the liquid crystal molecules are moved by a horizontal direction electric field, has excellent viewing angle characteristics.

As a method of aligning an alignment film that is used in liquid crystal display devices, that is, imparting alignment control ability, the related art includes a method of aligning the alignment film by rubbing. This is a method where alignment is performed by rubbing the alignment film with a cloth. On the other hand, there is a technique called photoalignment where alignment control ability is imparted to the alignment film without contact. IPS does not require a pretilt angle, so photoalignment can be applied thereto.

In JP-A-2004-206091, there is disclosed photodegradative photoalignment by irradiation with light represented by ultraviolet light. According to this, photodegradative photoalignment (1) reduces alignment disorder caused by the complex step structure of the pixel portions and (2) resolves display defects caused by alignment disorder resulting from dust or disorder of the bristle tips of the rubbing cloth and breakage of the thin film transistors resulting from static electricity during alignment by rubbing and resolves the cumbersomeness of the process of frequent replacement of the rubbing cloth that is needed in order to obtain homogenous alignment control ability.

However, it is known that, in regard to the point of imparting alignment control ability to the alignment film, alignment stability is usually lower in photoalignment in comparison to alignment stability in rubbing. When alignment stability is low, the initial alignment direction fluctuates, which leads to display defects. Particularly in liquid crystal display devices that use an in-plane switching liquid crystal display panel where high alignment stability is demanded, it is easy for display defects symbolized by afterimages to occur as a result of alignment stability being low.

In photoalignment, there is, in the LCD process, no step of stretching the main chain of a polymer into a straight line as there is in rubbing. For that reason, in photoalignment, the main chain of a synthetic polymer alignment film represented by a polyimide that has been irradiated with polarized light is broken in a direction parallel to the polarization direction, whereby uniaxiality is imparted. The liquid crystal molecules align along the direction of the long main chain that remains extending on a straight line without being broken, but when the length of this main chain becomes short, uniaxiality drops, interaction with the liquid crystal becomes weak and alignment deteriorates, so it becomes easy for afterimages to occur.

Consequently, in order to improve the uniaxiality of the alignment film and improve alignment stability, it is necessary to increase the molecular weight of the alignment film. As a technique for solving this, a photoalignment film material obtained by imidizing polyamide acid alkyl ester can be used. According to this, in the polyamide acid alkyl ester material, the molecular weight can be kept large even after imidization without being accompanied by a decomposition reaction to an anhydride and a diamine at the time of the imidization reaction that had occurred in the conventional polyamide acid material, and alignment stability on a par with rubbing can be obtained.

Further, the polyamide acid alkyl ester material does not include carboxylic acid in its chemical structure, so its LCD voltage holding ratio rises in comparison to the polyamide acid material, and an improvement in long-term reliability can also be ensured.

In order to obtain alignment stability and long-term reliability of a photoalignment film, application of the polyamide acid alkyl ester material is effective, but this material usually has high alignment film specific resistance in comparison to the polyamide acid material. For that reason, when a direct-current voltage superposes on the signal waveform that drives the liquid crystal molecules and becomes residual DC, the time constant until the residual DC eases is large and it becomes easy for this to lead to image persistence (DC afterimages).

SUMMARY

It is an object of the invention to provide a liquid crystal display device that uses a liquid crystal display panel that can reduce the disappearance time of DC afterimages without impairing the alignment stability and the long-term reliability of a polyamide acid alkyl ester material and can perform high-definition display.

The invention overcomes the above-described problems, and its specific means are as follows. That is, a liquid crystal display device of the invention is equipped with a liquid crystal display panel comprising: a TFT substrate that has a TFT alignment film on the top of its main surface on which active elements for pixel selection are formed; an opposing substrate that has a color filter alignment film on the top of its main surface on which color filters are formed; and liquid crystal that is sealed between the TFT alignment film of the TFT substrate and the color filter alignment film of the opposing substrate. Further, the TFT alignment film and the color filter alignment film have a liquid crystal alignment control function imparted by irradiation with light.

The alignment film material for imparting, with respect to at least one of the alignment film of the TFT substrate and the opposing substrate alignment film on which the color filters are formed, the liquid crystal alignment control function by irradiation with light is configured by a 2-component system material comprising a material that is aligned by light represented by ultraviolet light and a material whose specific resistance is low. After alignment film formation, each of the alignment films is configured by a 2-layer structure comprising a photoalignment film for aligning and a low-resistivity film that does not contribute to alignment.

The material that is aligned by light can comprise a material obtained by polyimidizing photodegradable polyamide acid alkyl ester. Further, a material where this chemical imidization is equal to or greater than 70% can be used.

The low-resistivity material can comprise a material obtained by polyimidizing a polyamide acid material, but it is not necessary for this to be photodegradable. Further, a material where this chemical imidization is equal to or greater than 40% can be used.

According to the invention, the material comprising the 2-component system is phase-separated to give each of the alignment films a 2-layer structure, the photoalignment component whose alignment stability is high is disposed on the liquid crystal layer side and the low-resistivity component where alignment stability is unnecessary is disposed on the substrate side, whereby it becomes possible to simultaneously satisfy alignment stability and a reduction in the time constant of DC afterimages resulting from the resistance of the alignment film becoming lower; as a result, afterimage characteristics of the photoalignment film are significantly improved.

Further, the low-resistivity component disposed on the substrate side does not contribute to alignment, so its molecular weight can be lowered to the utmost extent. For that reason, the margin expands in regard to adjusting the viscosity and concentration of the alignment film varnish where the polyamide acid alkyl ester and the polyamide acid have been dissolved in an organic solvent, and, in regard to the method of forming the alignment film, not only in conventional flexo printing but also in inkjet coating, where it had been difficult to make the alignment film thick because it has been necessary to make the viscosity of the varnish low, the margin with respect to making the alignment film thick improves.

DETAILED DESCRIPTION

The content of the invention will be described in detail by the following embodiments.

Embodiment 1

Figure 1:
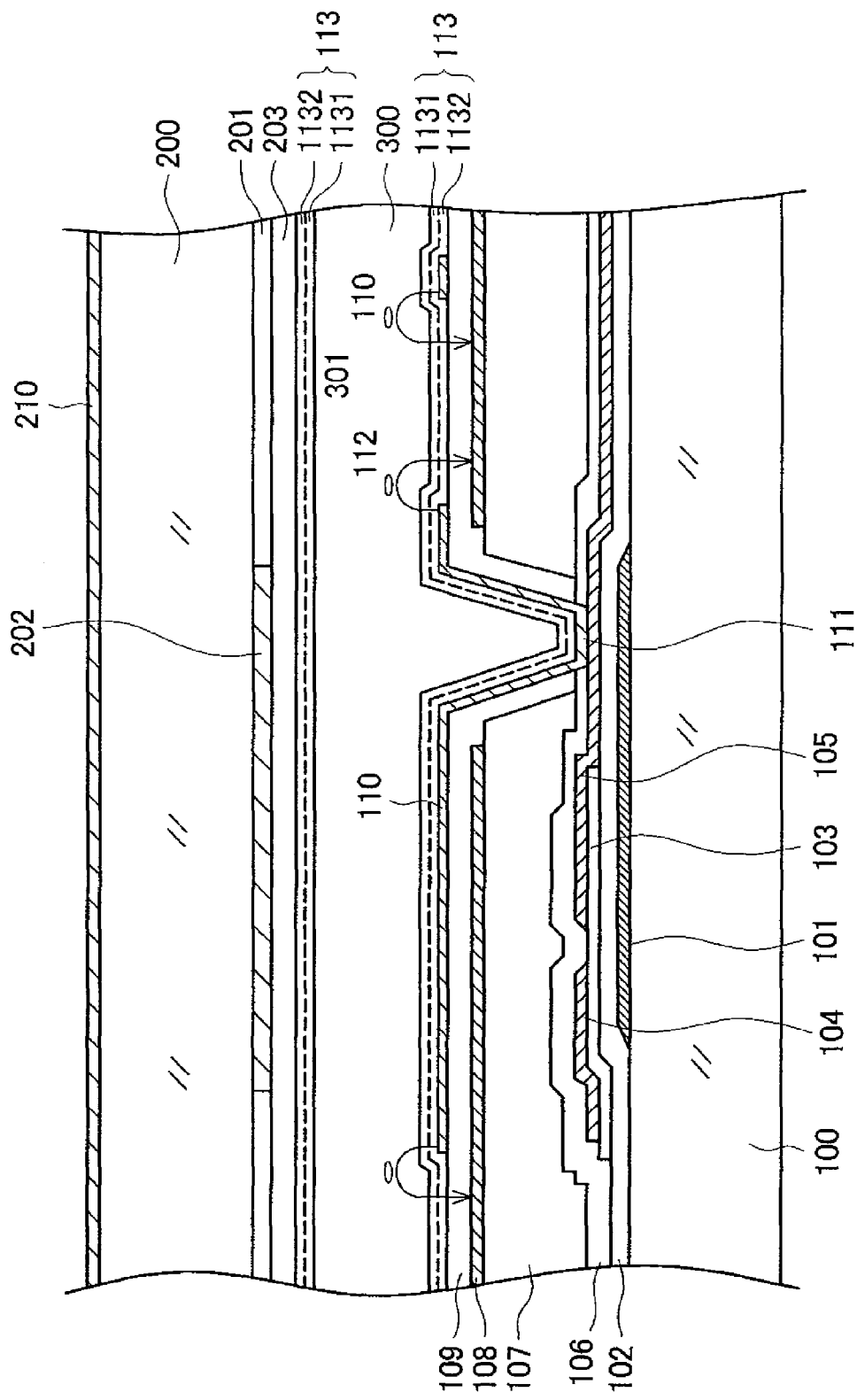
FIG. 1 is a cross-sectional diagram of an IPS liquid crystal display device.

FIG. 1 is a cross-sectional diagram showing a structure in a display region of an IPS liquid crystal display device. Various structures are being proposed and put to practical use for the electrode structure of IPS liquid crystal display devices. The structure in FIG. 1 is a structure that is currently being widely used; simply put, a pectinate pixel electrode 110 is formed on an opposing electrode 108 formed in a flat solid, with an insulating film sandwiched between the pixel electrode 110 and the opposing electrode 108. Additionally, the liquid crystal display device forms an image by controlling the transmittance of light through a liquid crystal layer 300 per pixel by causing liquid crystal molecules 301 to be rotated by a voltage between the pixel electrodes 110 and the opposing electrodes 108. The structure in FIG. 1 will be described in detail below. It will be noted that, although the invention will be described taking the structure in FIG. 1 as an example, the invention can also be applied to IPS type liquid crystal display devices other than the one shown in FIG. 1, such as a device where the opposing electrode is positioned on an upper insulating film and the pixel electrode is positioned under the upper insulting film or a device where the opposing electrode and the pixel electrode are on the same plane.

In FIG. 1, a gate electrode 101 is formed on a TFT substrate 100 formed by glass. The gate electrode 101 is formed in the same layer as a scan line. The gate electrode 101 comprises a MoCr alloy laminated on an AlNd alloy.

A gate insulating film 102 is formed by SiN so as to cover the gate electrode 101. A semiconductor layer 103 is formed on the gate insulating film 102 by an a-Si film in a position opposing the gate electrode 101. The a-Si film is formed by plasma CVD. The a-Si film forms a TFT channel portion, and a source electrode 104 and a drain electrode 105 are formed on the a-Si film, with the channel portion between the source electrode 104 and the drain electrode 105. It will be noted that an unillustrated n+Si layer is formed between the a-Si film and the source electrode 104 or the drain electrode 105. This is to establish an ohmic contact between the semiconductor layer 103 and the source electrode 104 or the drain electrode 105.

A picture signal line doubles as the source electrode 104, and the drain electrode 105 is connected to the pixel electrode 110. Both the source electrode 104 and the drain electrode 105 are formed in the same layer at the same time. In the present embodiment, the source electrode 104 or the drain electrode 105 is formed by a MoCr alloy. When one wishes to lower the electric resistance of the source electrode 104 or the drain electrode 105, an electrode structure where, for example, an AlNd alloy is sandwiched by a MoCr alloy is used.

An inorganic passivation layer 106 is formed by SiN so as to cover the TFT. The inorganic passivation layer 106 protects particularly the channel portion of the TFT from an impurity 401. An organic passivation layer 107 is formed on the inorganic passivation layer 106. The organic passivation layer 107 protects the TFT and, at the same time, also has the function of flattening its surface, so the organic passivation layer 107 is thickly formed. Its thickness is 1 µm to 4 µm.

A photosensitive acrylic resin, silicon resin or polyimide resin is used for the organic passivation layer 107. It is necessary to form a through hole 111 in the portion of the organic passivation layer 107 where the drain electrode 105 connects to the pixel electrode 110, but because the organic passivation layer 107 is photosensitive, the through hole 111 can be formed without using a photoresist by exposing and developing the organic passivation layer 107 itself.

The opposing electrode 108 is formed on the organic passivation layer 107. The opposing electrode 108 is formed by sputtering indium tin oxide (ITO), which is a transparent conductive film, on the entire display region. That is, the opposing electrode 108 is formed planarly. After the opposing electrode 108 is formed by sputtering on the entire surface, the opposing electrode 108 is removed by etching only at the through hole 111 portion for allowing the pixel electrode 110 and the drain electrode 105 to be conductive.

An upper insulating film 109 is formed by SiN so as to cover the opposing electrode 108. After an upper electrode is formed, the through hole 111 is formed by etching. This upper insulating film 109 is used as a resist to etch the inorganic passivation layer 106 and form the through hole 111. Thereafter, ITO, which becomes the pixel electrode 110, is formed by sputtering so as to cover the upper insulating film 109 and the through hole 111. The sputtered ITO is patterned to form the pixel electrode 110. The ITO that becomes the pixel electrode 110 is also deposited in the through hole 111. In the through hole 111, the drain electrode 105 extending from the TFT and the pixel electrode 110 are conductive, and a picture signal is supplied to the pixel electrode 110.

Figure 2:
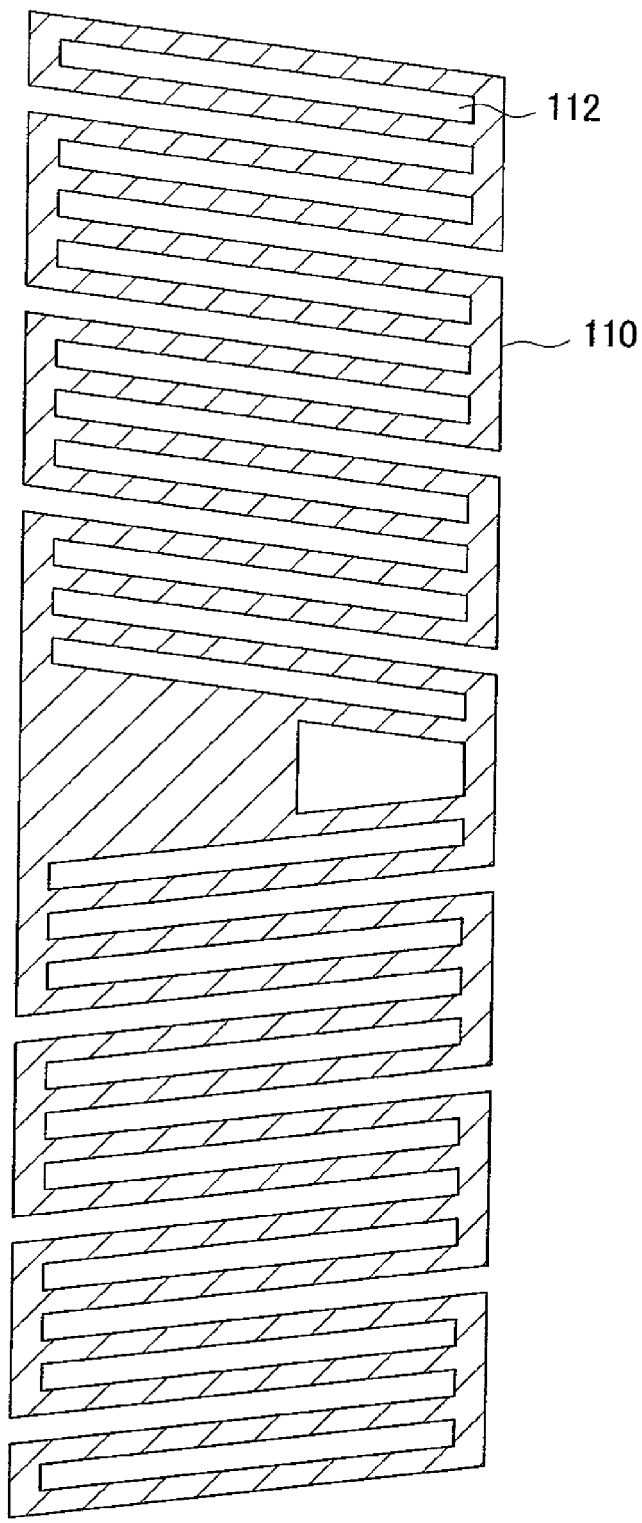
FIG. 2 is a plan diagram of a pixel electrode of FIG. 1.

One example of the pixel electrode 110 is shown in FIG. 2. The pixel electrode 110 is a pectinate electrode whose both ends are closed. Slits 112 are formed between the comb teeth. The planar opposing electrode 108, which is not illustrated here, is formed under the pixel electrode 110. When the picture signal is applied to the pixel electrode 110, the liquid crystal molecules 301 are rotated by electric force lines arising between the pixel electrode 110 and the opposing electrode 108 through the slits 112. Thus, light passing through the liquid crystal layer 300 is controlled to form an image.

FIG. 1 is a diagram where this aspect is described as a cross-sectional diagram. The slit 112 shown in FIG. 1 is between a pectinate electrode and a pectinate electrode. A constant voltage is applied to the opposing electrode 108, and a voltage resulting from the picture signal is applied to the pixel electrode 110. When a voltage is applied to the pixel electrode 110, as shown in FIG. 1, electric force lines arise and cause the liquid crystal molecules 301 to rotate in the direction of the electric force lines and control the transmittance of light from a backlight. An image is formed because transmittance from the backlight is controlled per pixel.

In the example in FIG. 1, the planarly formed opposing electrode 108 is disposed on the organic passivation layer 107 and the pectinate electrode 110 is disposed on the upper insulating film 109. However, conversely from this, there are also instances where a planarly formed pixel electrode 110 is disposed on the organic passivation layer 107 and a pectinate opposing electrode 108 is disposed on the upper insulating layer 109.

An alignment film 113 for aligning the liquid crystal molecules 301 is formed on the pixel electrode 110. In the invention, the alignment film 113 has a 2-layer structure comprising a photoalignment film 1131 that contacts the liquid crystal layer 300 and a low-resistivity alignment film 1132 that is formed on the bottom of the photoalignment film 1131. The structure of the alignment film 113 will be described in detail later.

In FIG. 1, an opposing substrate 200 is disposed with the liquid crystal layer 300 sandwiched between the opposing substrate 200 and the TFT substrate 100. Color filters 201 are formed on the inner side of the opposing substrate 200. As for the color filters 201, color filters 201 of red, green and blue are formed per pixel and a color image is formed. A black matrix 202 is formed between the color filters 201 to improve image contrast. It will be noted that the black matrix 202 also has a role as a TFT light blocking film and prevents a photocurrent from flowing in the TFT.

An overcoat film 203 is formed so as to cover the color filters 201 and the black matrix 202. The surface of the color filters 201 and the black matrix 202 is uneven, so the surface is made flat by the overcoat film 203.

An alignment film (orientation film) 113 for determining initial alignment of the liquid crystal is formed on the overcoat film 203. The alignment film 113 of the opposing substrate 200 also, similar to the alignment film 113 of the TFT substrate 100, has a 2-layer structure comprising a photoalignment film 1131 that contacts the liquid crystal layer 300 and a low-resistivity alignment film 1132 that is formed on the bottom of the photoalignment film 1131. It will be noted that, because FIG. 2 is IPS, the opposing electrode 108 is formed on the TFT substrate 100 side and is not formed on the opposing substrate 200 side.

As shown in FIG. 1, in IPS, a conductive film is not formed on the inner side of the opposing substrate 200. Therefore, the potential of the opposing substrate 200 becomes unstable. Further, electromagnetic noise from outside penetrates the liquid crystal layer 300 and affects the image. In order to eliminate this problem, a surface conductive film 210 is formed on the outer side of the opposing substrate 200. The surface conductive film 210 is formed by sputtering ITO, which is a transparent conductive film.

Figure 3A:
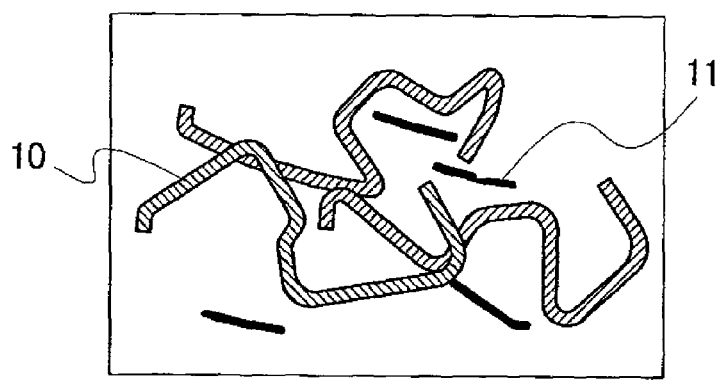
FIGS. 3A and 3B are diagrams showing the configuration of an alignment film according to the invention.
Figure 3B:
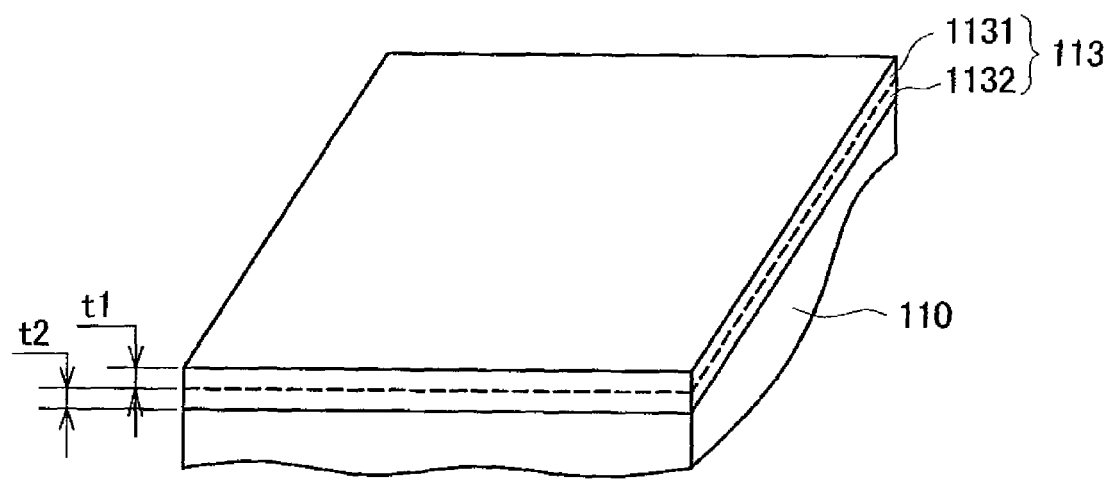

FIGS. 3A and 3B are schematic diagrams showing the alignment film 113 according to the invention. FIG. 3A is a plan transparent diagram of the alignment film 113, and FIG. 3B is a cross-sectional perspective diagram. The alignment film 113 of the invention has a 2-layer structure, with the top side that contacts the liquid crystal layer 300 being configured by the photoalignment film 1131 and the bottom side being configured by the low-resistivity alignment film 1132. The photoalignment film 1131 is formed by a photodegradable polymer 10 whose molecular weight is large, and the low-resistivity alignment film 1132 is formed by a low-resistivity polymer 11 whose molecular weight is small.

Because FIG. 3A is a transparent diagram, the photodegradable polymer 10 and the low-resistivity polymer 11 can be seen. In actuality, the photodegradable polymer 10 is present higher than the low-resistivity polymer 11. In FIG. 3B, the alignment film 113 is formed on the pixel electrode 110 or the organic passivation layer 107 of FIG. 1. In FIG. 3B, the alignment film 113 is shown as being formed on the pixel electrode 110. A thickness t1 of the photoalignment film 1131 on the top side is about 50 nm, and a thickness t2 of the low-resistivity alignment film 1132 on the bottom side is about 50 nm. The boundary between the photoalignment film 1131 and the low-resistivity alignment film 1132 is indicated by a dotted line because it is not clear.

Figure 4A:
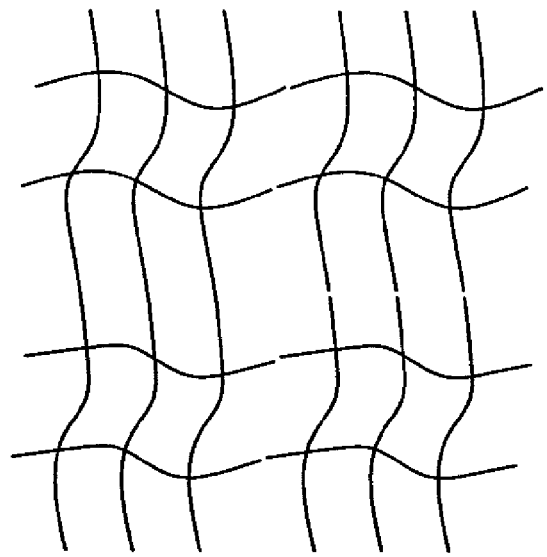
FIGS. 4A and 4B are diagrams showing the formation process of a photoalignment film.
Figure 4B:
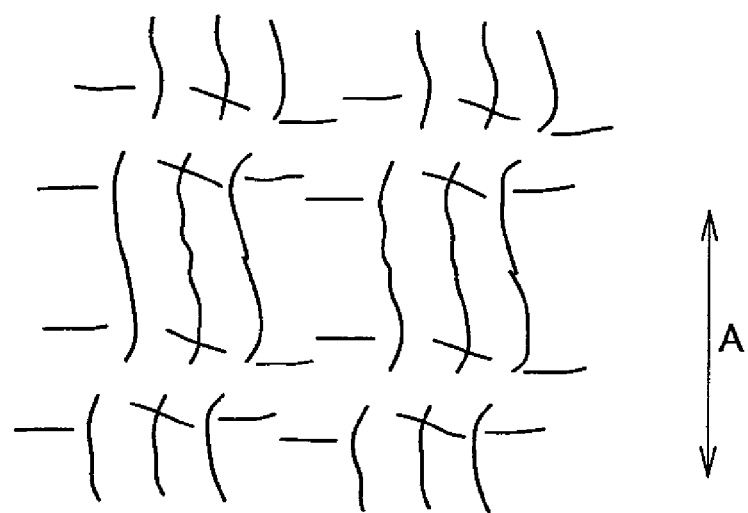

FIGS. 4A and 4B are schematic diagrams showing the process by which the liquid crystal is aligned by the photoalignment film 1131. In FIGS. 4A and 4B, the low-resistivity alignment film 1132 is omitted. FIG. 4A shows a state where the photoalignment film 1131 has been applied. The photoalignment film 1131 is formed by the photodegradable polymer 10.

The photoalignment film 1131 shown in FIG. 4A is irradiated with polarized ultraviolet light at, for example, an energy of 6 $J/cm^2$. Therefore, the photodegradable polymer 10 in the polarization direction of the polarized ultraviolet light in the photoalignment film 1131 is, as shown in FIG. 4B, broken down by the ultraviolet light. That is, broken portions 15 resulting from the ultraviolet light are formed along the polarization direction of the ultraviolet light. Therefore, the liquid crystal molecules 301 become aligned in the direction of arrow A in FIG. 4B.

As shown in FIGS. 4A and 4B, when the main chain of the photodegradable polymer 10 is short, uniaxiality drops, interaction with the liquid crystal becomes weak and alignment deteriorates. Consequently, in FIG. 4B, even after photoalignment, it is desirable for the photodegradable polymer 10 to extend as long as possible in the direction of arrow A. In other words, in order to improve the uniaxiality of the alignment film 113 and improve alignment stability, it is necessary to increase the molecular weight of the alignment film 113.

The molecular weight of the alignment film 113 can be evaluated by number molecular weight. Number molecular weight is, when polymers of various molecular weights are present in the alignment film 113, the average molecular weight thereof. In the photoalignment film 1131, it is necessary for the number molecular weight to be equal to or greater than 5000 in order to obtain sufficient alignment stability.

In order to obtain the photoalignment film 1131 with a large number molecular weight, a film obtained by imidizing polyamide acid alkyl ester can be used. The structure of polyamide acid alkyl ester is as shown in chemical formula (1).

[Chemical Formula 1]

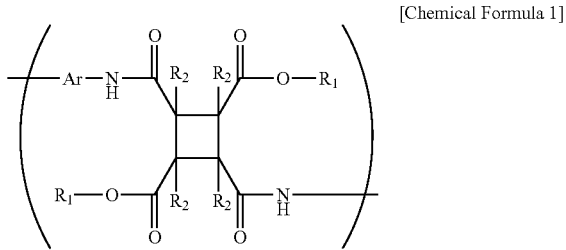

In chemical formula (1), R1 respectively independently represents an alkyl group with a carbon number of 1 to 8, R2 respectively independently represents a hydrogen atom, a fluorine atom, a chlorine atom, a bromine atom, a phenyl group, an alkyl group with a carbon number of 1 to 6, an alkoxy group with a carbon number of 1 to 6, a vinyl group (—(CH2)m—CH=CH2, m=0, 1, 2) or an acetyl group (—(CH2)m-C≡CH, m=0, 1, 2), and Ar represents an aromatic compound.

The characteristic of the polyamide acid alkyl ester is R1 in chemical formula (1). In the polyamide acid alkyl ester, R1 is CnH2n-1, and n is equal to or greater than 1. When the polyamide acid alkyl ester is used as the precursor of the photoalignment film 1131, the molecular weight can be kept large even after imidization without being accompanied by a decomposition reaction to an anhydride and a diamine at the time of the imidization reaction such as had occurred in the conventional polyamide acid material, and alignment stability on a par with rubbing can be obtained.

However, the specific resistance of the photoalignment film 1131 obtained by imidizing the polyamide acid alkyl ester is extremely high, such as, for example, about $10^{15}$ Ωcm. When the specific resistance of the alignment film 113 is high in this manner, the electric charge with which the liquid crystal layer 300 has been charged cannot be let out, and this electric charge causes DC afterimages.

In liquid crystal display devices, alternating-current driving is performed so as to not charge the liquid crystal layer with an electric charge, but when the liquid crystal display device displays a particular image for a particular amount of time, a DC component remains in one of the substrates for a certain amount of time, the liquid crystal layer is charged with an electric charge, and sometimes an afterimage arises because of the electric charge with which the liquid crystal layer has been charged. If the resistance of the alignment film 113 is not extremely large, the electric charge in the liquid crystal can be let out to the pixel electrode 110 or the like through the alignment film 113.

However, the specific resistance of the photoalignment film 1131 is extremely large, and the photoalignment film 1131 cannot let out the electric charge in the liquid crystal in a short amount of time. The invention solves this problem by giving the alignment film 113 a 2-layer structure comprising the photoalignment film 1131 and the low-resistivity alignment film 1132. That is, the photoalignment film 1131 that contacts the liquid crystal layer uses the photodegradable polymer 10 whose molecular weight is large in order to obtain sufficient alignment stability.

The bottom of the alignment film 113 is configured by the low-resistivity alignment film 1132 whose molecular weight is small and whose specific resistance is also small. The resistivity of the low-resistivity alignment film 1132 is, for example, about $10^{12}$ to $10^{14}$ Ωcm. The low-resistivity alignment film 1132 can be formed by a film obtained by imidizing polyamide acid.

The polyamide acid is expressed by the structure shown in chemical formula (2).

[Chemical Formula 2]

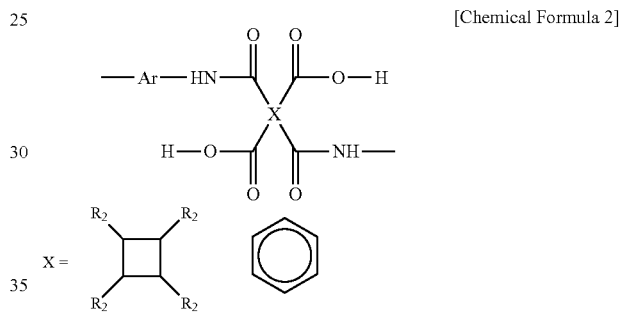

In chemical formula (2), R2 respectively independently represents a hydrogen atom, a fluorine atom, a chlorine atom, a bromine atom, a phenyl group, an alkyl group with a carbon number of 1 to 6, an alkoxy group with a carbon number of 1 to 6, a vinyl group (—(CH2)m-CH=CH2, m=0, 1, 2) or an acetyl group (—(CH2)m-C≡CH, m=0, 1, 2), and Ar represents an aromatic compound.

The polyamide acid differs from the polyamide acid alkyl ester in that, in chemical formula (1) representing the polyamide acid alkyl ester, R1 is replaced with H. The polyamide acid undergoes a decomposition reaction to a diamine and an anhydride at the time of the imidization reaction that forms the polyimide, so the polyimide cannot be given a sufficiently large molecular weight. Consequently, a sufficient characteristic cannot be obtained for the photoalignment film 1131. The specific resistance of the polyimide formed by the polyamide acid is not that large.

In this manner, by giving the alignment film 113 a 2-layer structure, alignment stability resulting from photoalignment can be ensured, the specific resistance of the alignment film 113 overall can be controlled to an appropriate value, and DC afterimages can be alleviated.

Figure 5A:
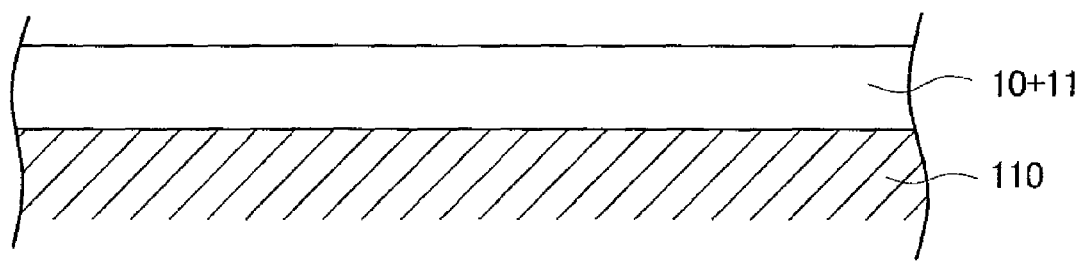
FIGS. 5A and 5B are cross-sectional diagrams of the alignment film of the invention.
Figure 5A:

In order to form the 2-layer structure alignment film 113, the alignment film 113 formation process can be performed without being increased. That is, as shown in FIG. 5A, when a material in which the photodegradable polymer 10 and the low-resistivity polymer 11 are mixed together is applied to a substrate, phase separation occurs such that the material that easily adapts to the substrate is formed on the bottom and the other material is formed on top. It will be noted that the substrate in FIG. 5A is represented by the pixel electrode 110.

Figure 5B:
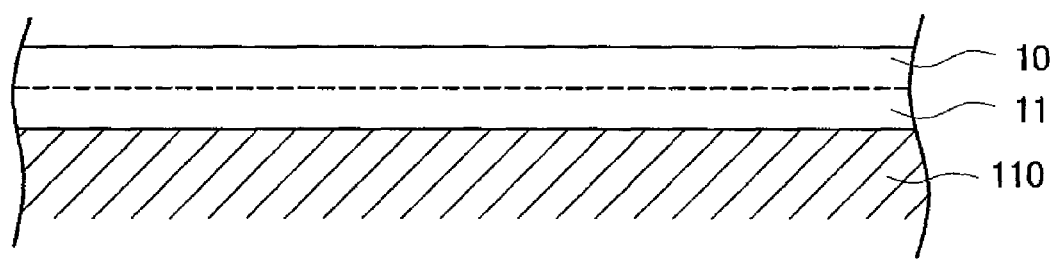

In the present embodiment, that which corresponds to the substrate is the ITO that forms the pixel electrode 110 or the organic passivation layer 107. In FIGS. 5A and 5B, the pixel electrode 110 is shown as the substrate. The polyamide acid more easily adapts to the ITO that forms the pixel electrode 110 or the organic passivation layer 107 in comparison to the polyamide acid alkyl ester, so the polyamide acid always becomes the bottom layer.

Heat of about 200° C. is applied to the resin film formed in this manner to polyimidize the resin film. Polyimidization is performed at the same time with respect to both the polyamide acid on the bottom and the polyamide acid alkyl ester on the top. Consequently, formation of a 2-layer alignment film 113 can be performed by the same process as the formation of a 1-layer alignment film 113.

The photoalignment film 1131 on the top stabilizes the alignment characteristic, so it is necessary to raise its imidization ratio because it is necessary to increase the molecular weight of the photodegradable polymer 10. The imidization ratio of the photodegradable film 1131 is equal to or greater than 70% and more preferably equal to or greater than 80%. As for the rest of this, the polyamide acid alkyl ester that serves as the precursor becomes present in the photoalignment film 1131.

The low-resistivity alignment film 1132 on the bottom has no relationship with the photoalignment characteristic of the liquid crystal, so its imidization ratio may be low. For example, it suffices for the imidization ratio to be equal to or greater than 40%. That is, it suffices for the condition of imidization to be set focusing on the imidization of the polyamide acid alkyl ester on the top.

The boundary between the top layer and the bottom layer of the alignment film 113 is not clear. In FIG. 5B, this boundary is indicated by a dotted line. In FIG. 5B, the molecular weight of the photoalignment film 1131 on the top is larger than that of the low-resistivity alignment film 1132 on the bottom. When the molecular weights of the photoalignment film 1131 and the low-resistivity alignment film 1132 are compared, it suffices to compare the molecular weight at the surface of the photoalignment film 1131 and the molecular weight at the interface between the low-resistivity alignment film 1132 and the substrate.

Figure 6:
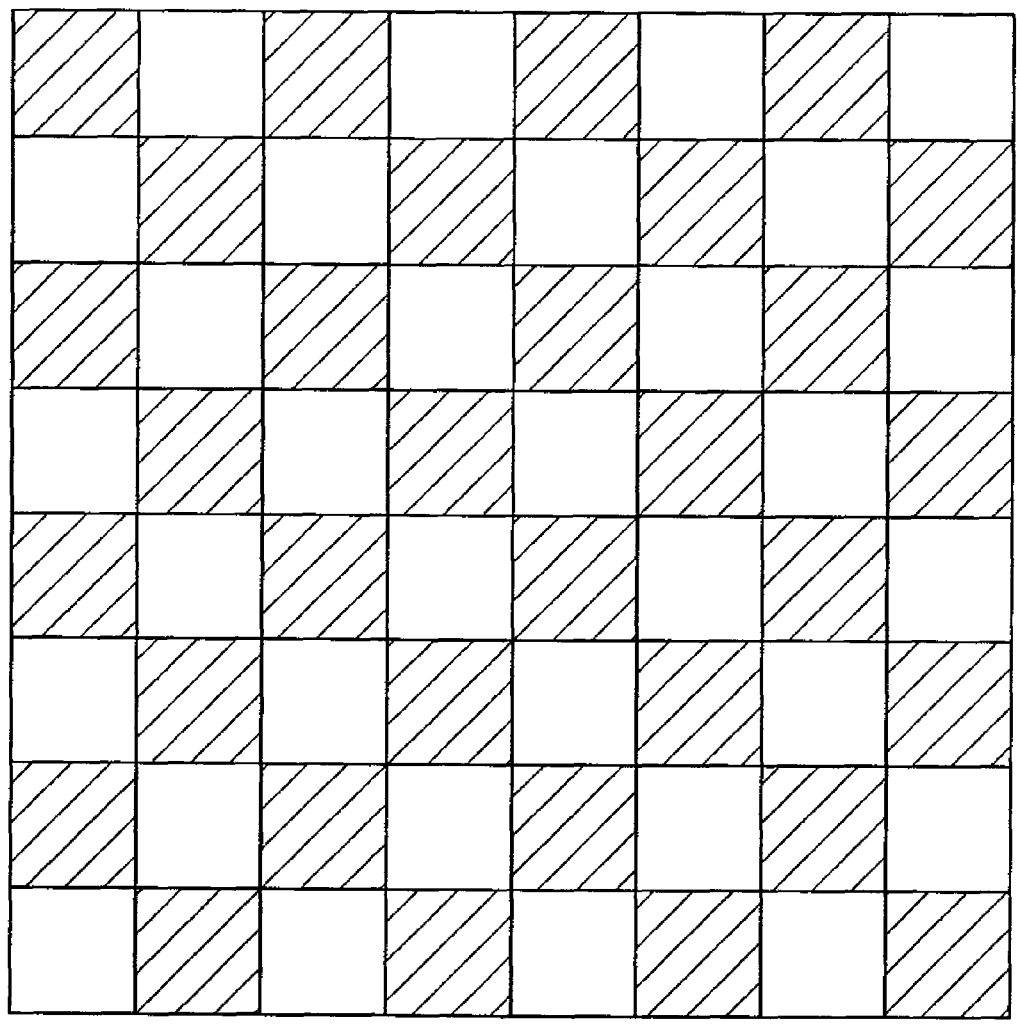
FIG. 6 shows a DC afterimage evaluation pattern.

DC afterimage characteristics in a case where the alignment film 113 with the 2-layer structure comprising the photoalignment film 1131 and the low-resistivity alignment film 1132 is used as the alignment film and a case where an alignment film having only the photoalignment film is used are evaluated. Afterimages are evaluated as follows. That is, a black-and-white 8×8 checker flag pattern such as shown in FIG. 6 is displayed for 12 hours and thereafter returned to a gray color solid halftone. The halftone gradation is 64/256.

Figure 7:
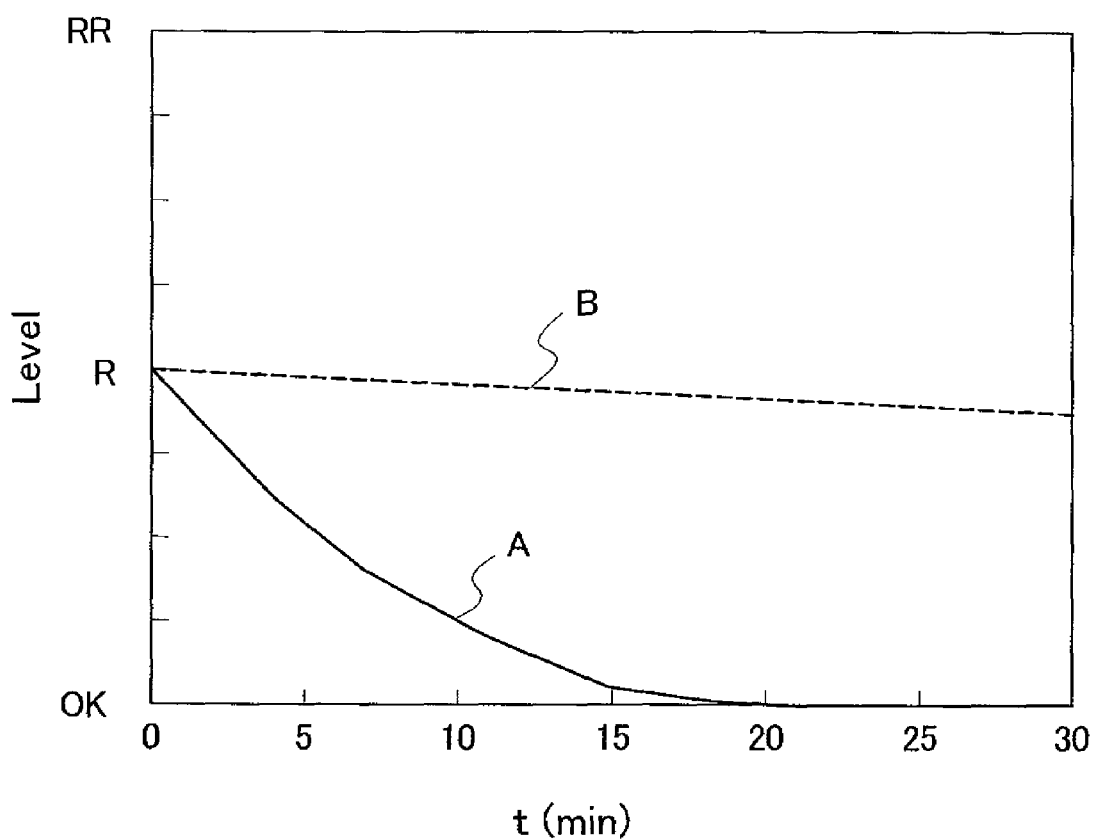
FIG. 7 shows DC afterimage evaluation results.

FIG. 7 shows DC afterimage evaluation results. In FIG. 7, the horizontal axis represents the amount of time after the pattern has been returned to the gray color solid halftone. The vertical axis represents the level of the afterimage. On the vertical axis, RR is a state where the checker flag pattern can be seen well when it has been returned to the halftone, and is no good. R is a state where the checker flag pattern is faint but can still be seen when it has been returned to the halftone. In FIG. 7, curve A is a DC afterimage characteristic when the alignment film according to the invention is used. Further, curve B is an example of a DC afterimage characteristic when just a 1-layer photoalignment film is used as the alignment film.

It can be said that, when the pattern has been returned to the halftone, there is no problem in terms of practical use even when the level of the afterimage is R if this disappears in a short amount of time. In the case of the 1-layer photoalignment film, level R when the pattern has been returned to the halftone continues for a long period of time, so a practical problem remains. On the other hand, in the alignment film 113 with the 2-layer structure according to the invention, the DC afterimage rapidly decreases, and after the pattern has been returned to the halftone, the DC afterimage completely disappears in about 17 minutes.

In this manner, the large difference between the case of the 1-layer photoalignment film and the case of the alignment film of the invention is that, whereas the DC afterimage continues for a long time in the case of the 1-layer photoalignment film, the DC afterimage rapidly decreases when the alignment film of the invention is used. In FIG. 7, when the levels of the DC afterimage 10 minutes after the pattern has been returned to the halftone that becomes a rough indication of the DC afterimage, the DC afterimage is 90% in the case where the alignment film is configured by just the 1-layer photoalignment film, but the DC afterimage in the invention becomes equal to or less than 25%, and it will be understood that the effect of the invention is extremely large.

Incidentally, in order to stabilize the alignment characteristic in the photoalignment film 1131, it is better for the molecular weight of the photodegradable polymer 10 to be large. However, when the molecular weight is large, the viscosity of the alignment film varnish becomes high. When the viscosity becomes high, flexo printing and inkjet coating become difficult, so the concentration of the material is lowered to lower the viscosity. Therefore, the coating film ends up becoming thin. Consequently, the coating condition for forming the alignment film 113 by just the 1-layer of the photoalignment film ends up becoming limited.

In contrast, the invention has the following advantages. That is, the low-resistance component disposed on the substrate side does not contribute to alignment, so the molecular weight can be lowered to the utmost limit. For that reason, the margin expands in regard to adjusting the concentration and viscosity of the alignment film varnish where the polyamide acid alkyl ester and the polyamide acid have been dissolved in an organic solvent, and, in regard to the method of forming the alignment film 113, not only conventional flexo printing but also inkjet coating, where it had been difficult to make the alignment film 113 thick because it has been necessary to make the viscosity of the varnish low, become possible.

Embodiment 2

In embodiment 1, a film obtained by imidizing the polyamide acid is used as the low-resistivity alignment film 1132 on the bottom of the 2-layer alignment film 113. The low-resistivity alignment film 1132 has no relationship with photoalignment, so a material can be selected focusing on making the resistance of the alignment film 113 small.

In liquid crystal display devices, a backlight is disposed on the back surface of the liquid crystal display panel, and an image is formed by controlling the light from the backlight per pixel. A cold-cathode tube or a light-emitting diode is used as the light source of the backlight. Consequently, the alignment film 113 becomes always exposed to the light from the backlight while the liquid crystal display device is operating. When a photoconductive film is used as the low-resistivity alignment film 1132 on the bottom, the electric charge with which the liquid crystal layer has been charged can be let out more quickly, and DC afterimages can be alleviated more.

As a material by which the alignment film material exhibits a photoconductive characteristic, for example, there can be listed Nissan Chemical's SE6414. In this case also, when this is mixed together with the polyamide acid alkyl ester and the mixture material is applied onto the substrate, the material phase-separates and becomes a 2-layer structure. In this case also, the polyamide acid alkyl ester becomes the top layer. Thereafter, heat is applied to imidize the material, but this imidization can also be performed at the same time.

The above description has been given in regard to the alignment film 113 of the TFT substrate 100, but the same is also true in regard to the alignment film 113 of the opposing substrate 200. The alignment film 113 of the opposing substrate 200 is formed on the overcoat film 203, but in this case also, the familiarity of the low-resistivity polymer 11, which forms the low-resistivity alignment film 1132, with the overcoat film 203 is strong, so the low-resistivity alignment film 1132 is formed on the overcoat film 203 by leveling, and the photoalignment film 1131 is formed thereon.

It will be noted that effects can be obtained even when the alignment film 113 with the 2-layer structure according to the invention is applied just to the alignment film 113 of the TFT substrate 100 or the opposing substrate 200. This is because letting out the electric charge in the liquid crystal layer can raise a certain effect even from just either substrate.

As described above, according to the invention, sufficient alignment regulation resulting from photoalignment can be stably performed, and the problem of a DC afterimage resulting from the photoalignment film 1131 coming to have high resistivity can be solved.

It will be noted that the pretilt angle of the liquid crystal display device to which the invention is applied becomes equal to or less than 0.5 degrees according to measurement using the crystal rotation method.

What is claimed is:

1. A liquid crystal display device comprising:
   a TFT substrate comprising thin film transistors, pixel electrodes and an alignment film formed over the thin film transistor and the pixel electrodes;
   an opposing substrate comprising color filters and an alignment film formed over the color filters; and
   a liquid crystal disposed between the first alignment film and the second alignment film,
   wherein
   each of the alignment films comprises a first alignment film that contacts the liquid crystal layer and has a first polyamide, and a second alignment film that is formed on the bottom of the first alignment film and has a second polyimide,
   the number molecular weight of the first alignment film is greater than the number molecular weight of the second alignment film,
   the resistivity of the first alignment film is greater than the resistivity of the second alignment film,
   the first alignment film includes polyamide acid alkyl ester having the structure of the following chemical formula (1)

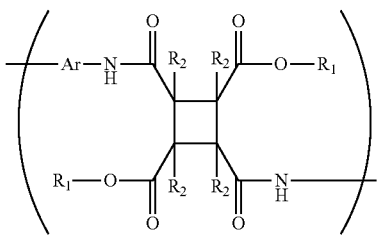

[Chemical Formula 1]

where R1 respectively independently represents an alkyl group with a carbon number of 1 to 8, R2 respectively independently represents a hydrogen atom, a fluorine atom, a chlorine atom, a bromine atom, a phenyl group, an alkyl group with a carbon number of 1 to 6, an alkoxy group with a carbon number of 1 to 6, a vinyl group ($-(CH_2)_m-CH=CH_2$, m=0, 1, 2) or an acetyl group ($-(CH_2)_m-C\equiv CH$, m=0, 1, 2), and Ar represents an aromatic compound, and
photoalignment is administered to the first alignment film.

2. The liquid crystal display device according to claim 1, wherein the second alignment film includes polyamide acid having the structure of the following chemical formula (2)

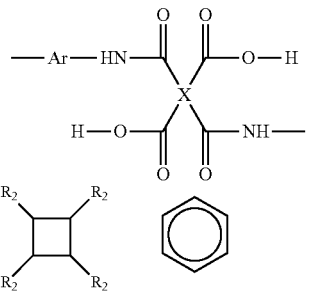

[Chemical Formula 2]

where R2 respectively independently represents a hydrogen atom, a fluorine atom, a chlorine atom, a bromine atom, a phenyl group, an alkyl group with a carbon number of 1 to 6, an alkoxy group with a carbon number of 1 to 6, a vinyl group ($-(CH_2)_m-CH=CH_2$, m=0, 1, 2) or an acetyl group ($-(CH_2)_m-C\equiv CH$, m=0, 1, 2), and Ar represents an aromatic compound.

3. The liquid crystal display device according to claim 1, wherein the imidization ratio of the first alignment film is greater than the imidization ratio of the second alignment film.

4. The liquid crystal display device according to claim 1, wherein the second alignment film is photoconductive.

5. The liquid crystal display device according to claim 2, wherein the imidization ratio of the first alignment film is greater than the imidization ratio of the second alignment film.

6. The liquid crystal display device according to claim 2, wherein the second alignment film is photoconductive.

* * * * *